United States Patent
Anand et al.

(10) Patent No.: US 12,111,884 B2
(45) Date of Patent: Oct. 8, 2024

(54) OPTIMAL SEQUENTIAL DECISION MAKING WITH CHANGING ACTION SPACE

(71) Applicant: ADOBE INC., San Jose, CA (US)

(72) Inventors: Tanay Anand, Bangalore (IN); Pinkesh Badjatiya, Madhya Pradesh (IN); Sriyash Poddar, Howrah (IN); Jayakumar Subramanian, Maharashtra (IN); Georgios Theocharous, San Jose, CA (US); Balaji Krishnamurthy, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 370 days.

(21) Appl. No.: 17/659,983

(22) Filed: Apr. 20, 2022

(65) Prior Publication Data

US 2023/0342425 A1    Oct. 26, 2023

(51) Int. Cl.
*G06F 18/2137*    (2023.01)
*G06N 3/088*    (2023.01)

(52) U.S. Cl.
CPC ......... *G06F 18/2137* (2023.01); *G06N 3/088* (2013.01)

(58) Field of Classification Search
CPC .............................. G06F 18/2137; G06F 3/088
USPC ........................................................ 382/159
See application file for complete search history.

(56) References Cited

U.S. PATENT DOCUMENTS

| | | | |
|---|---|---|---|
| 11,055,861 B2 * | 7/2021 | Nazari | G06F 11/203 |
| 2019/0266489 A1 * | 8/2019 | Hu | B60W 10/20 |
| 2021/0019642 A1 * | 1/2021 | O'Malia | G06F 40/279 |
| 2021/0089958 A1 * | 3/2021 | Theocharous | G06N 5/045 |

FOREIGN PATENT DOCUMENTS

| | | | | |
|---|---|---|---|---|
| EP | 4120042 A1 * | 1/2023 | | G05B 13/027 |
| WO | WO-2022083029 A1 * | 4/2022 | | A63F 13/822 |

OTHER PUBLICATIONS

Chandak, et al., "Lifelong Learning with a Changing Action Set," in Proceedings of the AAAI Conference on Artificial Intelligence, arXiv preprint: arXiv:1906.01770v3 [cs.LG] May 11, 2020, 16 pages.
Tao, et al., "Topology-Preserving Class-Incremental Learning," in European Conference on Computer Vision, Springer, 2020, pp. 254-270.
Martinetz, "Competitive Hebbian Learning Rule Forms Perfectly Topology Preserving Maps," in International Conference on Artificial Neural Networks. Springer, 1993, pp. 427-434.

* cited by examiner

*Primary Examiner* — Gabriel I Garcia
(74) *Attorney, Agent, or Firm* — F. CHAU & ASSOCIATES, LLC

(57) ABSTRACT

Systems and methods for machine learning are described. Embodiments of the present disclosure receive state information that describes a state of a decision making agent in an environment; compute an action vector from an action embedding space based on the state information using a policy neural network of the decision making agent, wherein the policy neural network is trained using reinforcement learning based on a topology loss that constrains changes in a mapping between an action set and the action embedding space; and perform an action that modifies the state of the decision making agent in the environment based on the action vector, wherein the action is selected based on the mapping.

20 Claims, 11 Drawing Sheets

OPTIMAL SEQUENTIAL DECISION MAKING WITH CHANGING ACTION SPACE

BACKGROUND

The following relates generally to machine learning, and more specifically to lifelong reinforcement learning. Reinforcement learning relates to how software agents make decisions in order to maximize a reward. This type of learning differs from supervised learning in that labeled training data is not needed. Instead, reinforcement learning balances exploration of unknown options and exploitation of existing knowledge. In some cases, a reinforcement learning model is modeled in the form of a Markov decision process (MDP).

In a reinforcement learning model, an agent interacts with an environment, which modifies the state of the agent, and results in a reward. The agent chooses an action from a set of actions for interacting with the environment according to a policy, with the goal of maximizing the expected reward or cumulative reward. However, in many scenarios, the set of available actions varies over time. Standard reinforcement learning frameworks are not suitable for incorporating a changing action set, and can suffer from catastrophic forgetting and cold-start issues. Therefore, there is a need in the art for decision making systems that can incorporate a changing set of available actions without forgetting previous learning.

SUMMARY

Embodiments of the present disclosure provide a decision making agent that includes a lifelong reinforcement learning model. The decision making agent incorporates new actions while preserving previous learning by resisting changes to the topology of an action embedding space. In some embodiments, the agent can observe new information about its environment to adjust the action set accordingly. This can mitigate or prevent forgetting of previous learning. In some embodiments, the decision making agent is configured to handle similar or duplicate actions by embedding the rewards of those actions in an action embedding space.

A method, apparatus, non-transitory computer readable medium, and system for lifelong reinforcement learning are described. One or more aspects of the method, apparatus, non-transitory computer readable medium, and system include receiving, by a monitoring component, state information that describes a state of a decision making agent in an environment; computing an action vector from an action embedding space based on the state information using a policy neural network of the decision making agent, wherein the policy neural network is trained using reinforcement learning based on a topology loss that constrains changes in a mapping between an action set and the action embedding space; and performing an action that modifies the state of the decision making agent in the environment based on the action vector, wherein the action is selected based on the mapping.

A method, apparatus, non-transitory computer readable medium, and system for lifelong reinforcement learning are described. One or more aspects of the method, apparatus, non-transitory computer readable medium, and system include receiving, by a monitoring component, state information of a decision making agent; selecting, by an action component, an action from an action set based on the state information using a policy neural network of the decision making agent; computing, by a learning component, a reward based on the action; computing, by the learning component, a topology loss that minimizes changes in a mapping between the action set and an action embedding space; and updating, by the learning component, parameters of the policy neural network based on the reward and the topology loss.

An apparatus, system, and method for lifelong reinforcement learning are described. One or more aspects of the apparatus, system, and method include a monitoring component configured to receive state information indicating a state of an environment; a policy neural network configured to compute an action vector from an action embedding space based on the state information, wherein the policy neural network is trained using reinforcement learning based on a topology loss that constrains changes in a mapping between an action set and the action embedding space; and an action component configured to perform an action that modifies the state based on the action vector, wherein the action is selected based on the mapping.

DETAILED DESCRIPTION

Figure 1:
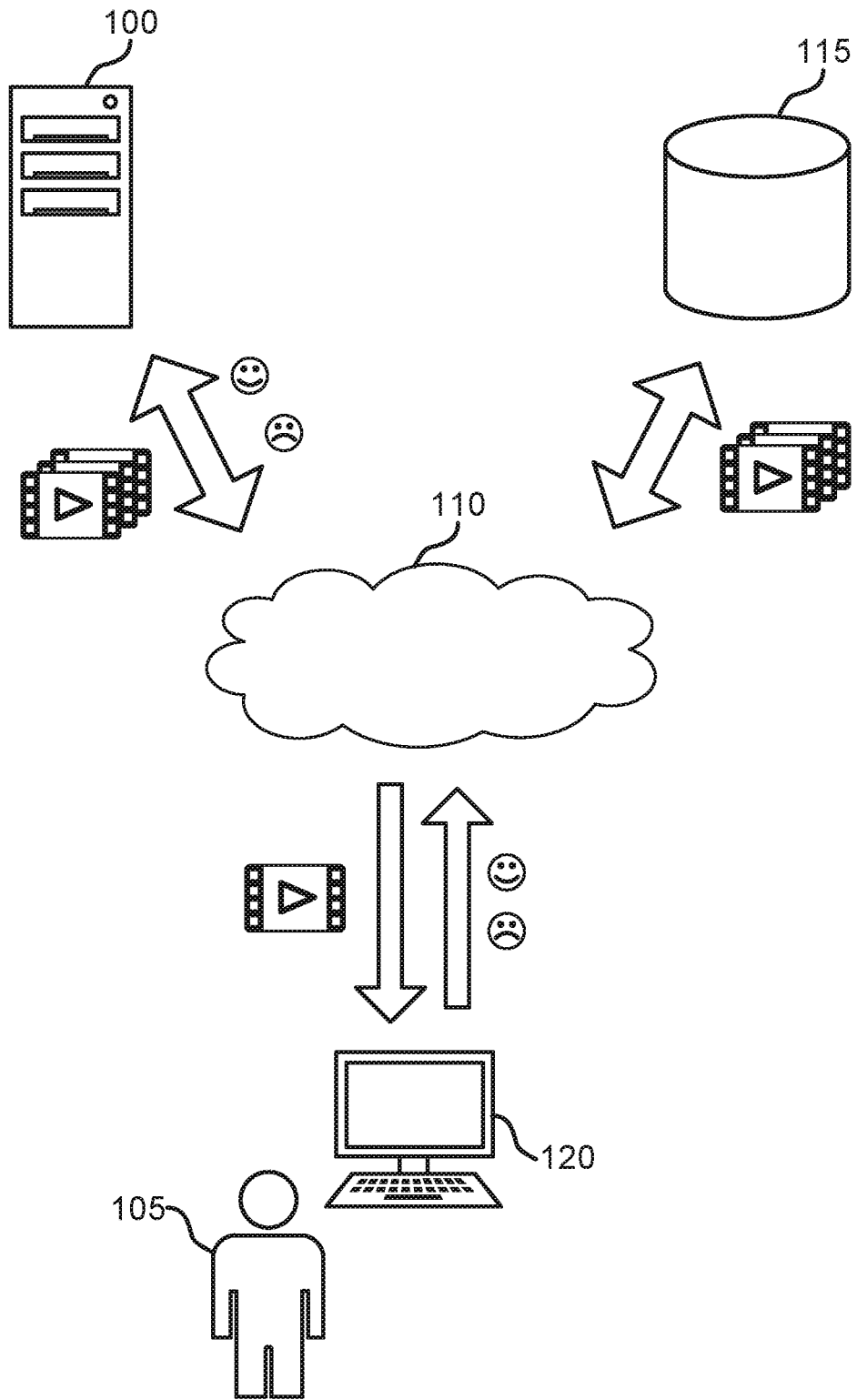
FIG. 1 shows an example of a decision making system according to aspects of the present disclosure.

The present disclosure relates to machine learning, and more specifically to reinforcement learning. Reinforcement learning models use a decision model such as a Markov Decision Process (MDP) to optimize a sequence of interactions with an environment. For example, a content provider may want to guide a user's journey in the use of a product, or suggest a sequence of videos or tutorials. Such sequential interactions include a sequence of content provider actions, such as sending communications to the user or recommending various content items, as well as corresponding user responses to the actions. This sequential interaction between a content provider and a user can be modeled as a reinforcement learning problem, with the objective of maximizing key performance indicators (KPIs). Specifically, the interaction between a content provider and a user can be modeled as a lifelong reinforcement learning problem utilizing an MDP, where the content provider is the decision making agent, and the user forms the environment.

Conventional reinforcement learning models are based on an MDP in which the action set is static. However, in many cases the set of actions available is dynamic and changes over time. Furthermore, some conventional reinforcement learning models utilize a heuristic or rule-based model to determine their policy and rewards. Other models utilize a neural network where the input layer receives state information about the environment, and the output layer contains nodes corresponding to an action set. However, both of these types of models are impractical when the action space is dynamic. New rules would have to be written for the actions, or the neural network architecture with the output layer corresponding to the selected action would have to be redesigned every time the action set changes. As a result, content providers must accept a drop in performance or manually transfer information about the new actions (including expected reward and loss information), which can be time consuming and expensive.

Embodiments of the present disclosure provide systems and methods for making decisions and learning an optimal policy given a dynamic action space. For example, embodiments of the disclosure include a decision making agent that is aware of its environment, and that includes a policy neural network trained to conserve the topology of an action embedding space upon adding new actions and receiving state information. Therefore, embodiments of the present disclosure include a policy neural network that is able to select a discrete action by exploring a continuous action embedding space without experiencing catastrophic forgetting when the action set changes.

Some embodiments of the present disclosure construct a universal action embedding space using topological invariance. This can ensure faster adaptation to changing action spaces by utilizing Class Incremental Learning techniques to maintain the topology of an action space, e.g., as modeled using a Hebbian Graph. Topology is preserved by maintaining the similarity between nodes, and new actions (nodes) are added with minimal distortion to the existing nodes.

Another aspect of the present disclosure utilizes adaptive topology in the universal action embedding space. By contrast, in comparative examples, directly enforcing topological constraints early in the lifetime of the model when the decision making agent has not explored enough actions can restrict the learning of the agent, and further lead to low-quality action embeddings. Embodiments of the present disclosure use an adaptive topology loss to ensure better learning and lead to high-quality embeddings.

Another aspect of the present disclosure provides reward-aware universal action embeddings. By contrast, comparative examples do not consider the reward obtained while learning the embeddings. Embodiments of the present disclosure are able to consider rewards while training the action embeddings, which helps to generate different embeddings for actions with similar transitions but different rewards.

Another aspect of the present disclosure addresses the cold start problem. Cold start is a well-known problem in recommender systems, wherein the performance of a new action or item to be recommended is unknown, and the effects of performing the new action can be detrimental and extend across multiple time steps. Embodiments of the present disclosure address this problem by identifying the nearest known neighbors of a given action in the universal action space embedding.

Another aspect of the present disclosure allows insights on the impact of new actions. For example, in a marketing context, mere data from past sequences of interactions may not be enough information to accurately estimate the impact of new actions. Through the use of the universal action space, embodiments of the present disclosure can get a more accurate estimate of the impact of the new actions based on their relationship in the embedding space.

Another aspect of the present disclosure provides customer segmentation based on embedded action interaction. In a comparative example in the marketing context, customers are segmented based on several attributes that are accessible to the content provider. For example, customers may be segmented based off of their profile attributes, such as age, gender, location, and the like. Embodiments of the present disclosure, however, may segment customers based on their responses to the content provider's action, which allows the formation of clusters of customers which have proximal optimal actions in the universal action embedding space. This segmentation is useful for identifying characteristics of customers that respond similarly to a given action.

Another aspect of the present disclosure is to provide localized policy improvement. In some embodiments, the decision making agent may be deployed with new actions to a subset of users. Data about the environment (e.g., the state of these users) may be used to improve the action embeddings. Then, the policy of the decision making agent can be updated using actions corresponding to the improved embeddings, resulting in localized policy improvement.

The term "state information" refers to information about the state of the environment of the decision making agent. It can include historical feedback, user interactions, navigation information, or the like.

The term "policy neural network" refers to a neural network of the decision making agent that is used to select an action based on state information.

The term "action vector" refers to a representation of an action or a set of actions determined by the policy neural network. Embodiments of the action vector include a list of probabilities corresponding to a set of available actions at a given time. For example, a chosen action may correspond to the action in the vector with the highest probability for the highest expected immediate or cumulative reward according to a reward function.

The term "action embedding space" refers to an intermediate representation of the actions available to the policy. In some embodiments, the action embedding space is a vector space in which vectors representing similar actions are located more closely than vectors representing dissimilar actions (e.g., based on the effects the actions have on the state of the decision making agent).

The term "topology loss" refers to a loss function that is used to maintain the topology (i.e., the arrangement of and distances between nodes) of the action embedding space. Embodiments of the topology loss include the correlation of distance between nodes prior to action addition with the distance between nodes after action addition, and tries to force the distances to have a higher correlation to maintain the topology of the action embedding space.

One or more embodiments of the present disclosure relate to a decision making system that provides content recommendations for users based on feedback from the users as described below with reference to FIG. 1.

Decision Making System

Figure 2:
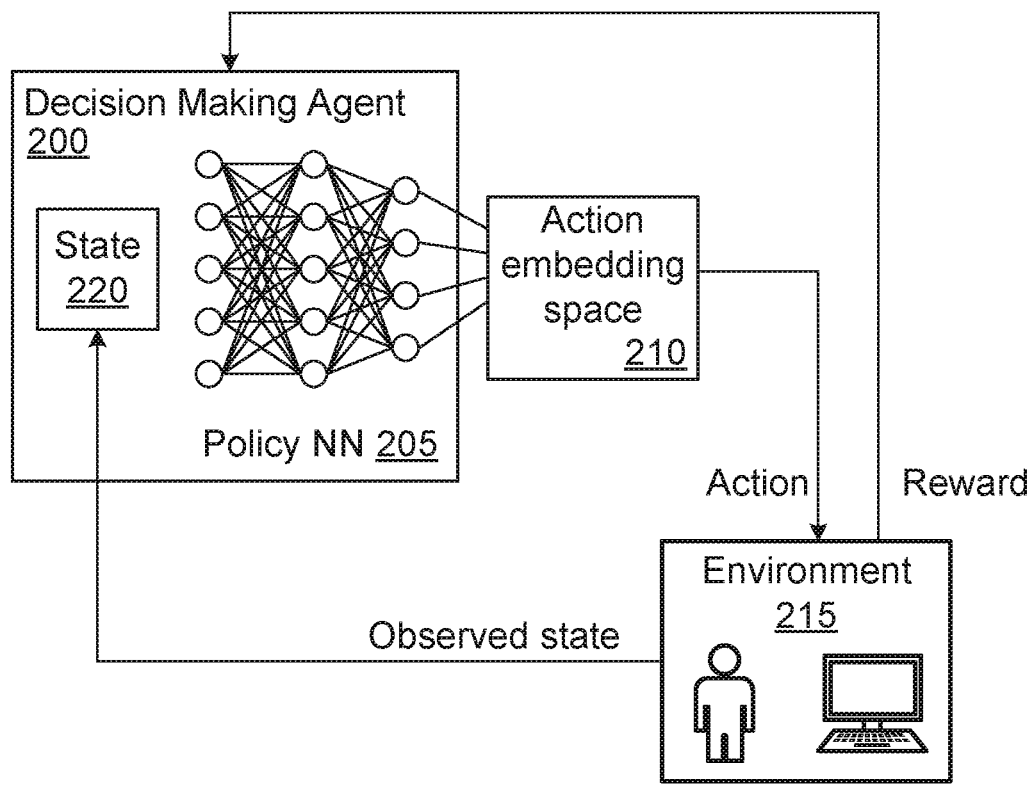
FIG. 2 shows an example of a reinforcement learning network according to aspects of the present disclosure.
Figure 3:
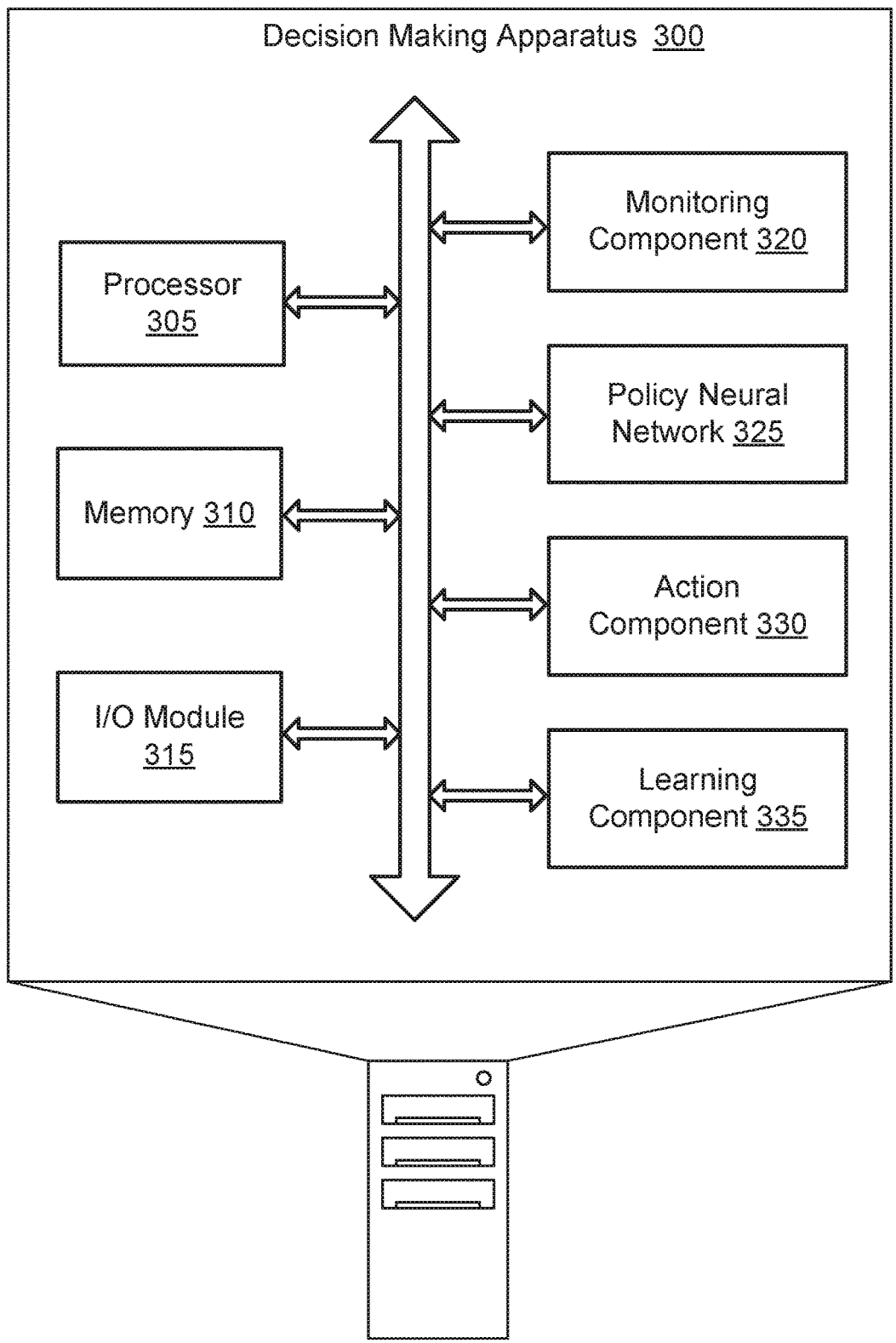
FIG. 3 shows an example of a decision making apparatus according to aspects of the present disclosure.

In FIGS. 1-3, a system and apparatus for lifelong reinforcement learning is described. One or more aspects of the apparatus include a monitoring component configured to receive state information indicating a state of an environment; a policy neural network configured to compute an action vector from an action embedding space based on the state information, wherein the policy neural network is trained using reinforcement learning based on a topology loss that constrains changes in a mapping between an action set and the action embedding space; and an action component configured to perform an action that modifies the state based on the action vector, wherein the action is selected based on the mapping.

Some examples of the apparatus, system, and method further include a learning component configured to compute a reward based on the action, and to update parameters of the policy neural network based on the reward. In some aspects, the learning component is configured to compute distances between each of a plurality of action embeddings in the action embedding space, wherein each of the plurality of action embeddings corresponds to an action from the action set, and wherein the topology loss is based on the distances.

In some aspects, the learning component is further configured to compute a decay value, and wherein the topology loss is based on the decay value. In some aspects, the learning component is further configured to embed the reward in the action embedding space, and wherein the parameters of the policy neural network are updated based on the embedding of the reward.

FIG. 1 shows an example of a decision making system according to aspects of the present disclosure. The example shown includes decision making apparatus 100, user 105, cloud 110, database 115, and user device 120. According to some aspects, decision making apparatus 100 provides content items to the user 105. The decision making apparatus 100 can represent the set of possible content items to recommend as an action set, and the user 105 can represent the environment of the decision making apparatus 100.

User 105 interacts with user device 120 to receive content items and provide feedback on the content items. According to some aspects, cloud 110 serves as an intermediary layer between database 115, decision making apparatus 100, and user device 120 and user 105. In some embodiments, decision making apparatus 100 receives content items from database 115 and holds them in memory. In some embodiments, decision making apparatus 100 receives feedback on the content items, and uses the feedback to determine another content item to provide to user 105.

A cloud 110 is a computer network configured to provide on-demand availability of computer system resources, such as data storage and computing power. In some examples, the cloud 110 provides resources without active management by the user. The term "cloud" is sometimes used to describe data centers available to many users over the Internet. Some large cloud 110 networks have functions distributed over multiple locations from central servers. A server is designated an edge server if it has a direct or close connection to a user. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location. The cloud 110 may facilitate the transfer of information between the decision making apparatus 100, the database 115, and the user 105.

A database 115 is an organized collection of data. For example, a database 115 stores data in a specified format known as a schema. The database 115 may be structured as a single database 115, a distributed database 115, multiple distributed databases 115, or an emergency backup database 115. In some cases, a database controller may manage data storage and processing in a database 115. In some cases, a user interacts with the database controller. In other cases, the database controller may operate automatically without user interaction. In some embodiments, database 115 stores and transfers content items to the cloud 110, and the content items are received by the decision making apparatus 100 and/or the user 105.

The decision making apparatus 100 may be implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used.

In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus. Decision making apparatus 100 is an example of, or includes aspects of, the corresponding element described with reference to FIG. 3.

The user 105 may include a user that interacts with a user device 120 via a user interface. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). The user 105 may be observed by the decision making apparatus 100. For example, the user may provide feedback on the content items, and this may constitute state information for the decision making apparatus 100. User 105 is an example of, or includes aspects of, the corresponding element described with reference to FIGS. 2 and 9.

FIG. 2 shows an example of a reinforcement learning network according to aspects of the present disclosure. The example shown includes decision making agent 200, policy neural network 205, action embedding space 210, environment 215, and state 220. The example shown may be modeled as Markov Decision Process (MDP).

An MDP is a decision making model used in situations where outcomes are partially under the control of a decision maker (the agent), and partially random (or not controlled by the agent). An MDP is defined by four primary components: a state set, an action set, a transition function, and a reward function. Given these components, a policy function is chosen that selects an action at each time period, based on the state, to maximize the reward. Decisions are made by selecting an action according to the policy function. The selected action causes a state transition which determines the future state (along with other random factors), which in turn impacts future decisions.

The state set refers to the set of possible states representing information that an agent has available to make a decision. The action set refers to the set of actions that are available to an agent at any given time in an MDP. As discussed previously, embodiments of the present disclosure embody a lifelong MDP which has a dynamic action set. The reward function refers to the function that specifies the relative value of different outcomes. The policy function refers to the function of an MDP that takes the current state as input and outputs an action (or a probability distribution over a set of actions). In other words, the policy function determines what decision the agent should make at any given time. The policy function may be implemented as a complex polynomial or with one or more neural networks.

Some embodiments of the present disclosure include a policy neural network 205 that implements the policy function. An agent seeks to find the optimal policy function that maximizes the reward function over time. In one aspect, decision making agent 200 includes policy neural network 205 and action embedding space 210.

Some embodiments implement policy neural network 205 as an artificial neural network. An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Action embedding space 210 is an example of, or includes aspects of, the corresponding element described with reference to FIG. 9. The action embedding space 210 allows the policy, e.g., the policy neural network 205, to analyze and explore latent actions within the action embedding space 210, and then determine a discrete action or action vector therefrom. Accordingly, many new actions can be added to the action embedding space 210 without changing the space's dimensions, and can then be considered by the policy.

Environment 215 is an example of, or includes aspects of, the corresponding element described with reference to FIGS. 1 and 9. For example, the environment may include a user that interacts with a user device in order to provide state information to the decision making agent.

In some embodiments, the decision making agent receives state information that describes a state of the decision making agent in an environment. For example, a monitoring component of a decision making apparatus receives the state information. A policy neural network then computes an action vector from an action embedding space based on the state information, wherein the policy neural network is trained using reinforcement learning based on a topology loss that constrains changes in a mapping between an action set and the action embedding space. Finally, the decision making agent (e.g., an action component of a decision making apparatus) performs an action that modifies the state of the decision making agent in the environment based on the action vector, wherein the action is selected based on the mapping between the action set and the embedding space.

FIG. 3 shows an example of a decision making apparatus 300 according to aspects of the present disclosure. Decision making apparatus 300 is an example of, or includes aspects of, the corresponding element described with reference to FIG. 1. In one aspect, decision making apparatus 300 includes processor 305, memory 310, I/O module 315, monitoring component 320, policy neural network 325, action component 330, and learning component 335.

A processor 305 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 305 is configured to operate a memory 310 array using a memory controller. In other cases, a memory controller is integrated into the processor 305. In some cases, processor 305 is configured to execute computer-readable instructions stored in memory 310 to perform various functions. In some embodiments, processor 305 includes special purpose components for modem processing, baseband processing, digital signal processing, or transmission processing.

Examples of a memory 310 device include random access memory (RAM), read-only memory (ROM), or a hard disk. Examples of memory devices include solid state memory and a hard disk drive. In some examples, memory 310 is used to store computer-readable, computer-executable software including instructions that, when executed, cause a processor 305 to perform various functions described herein. In some cases, the memory 310 contains, among other things, a basic input/output system (BIOS) which controls basic hardware or software operation such as the interaction with peripheral components or devices. In some cases, a memory controller operates cells in memory 310. For example, the memory controller can include a row decoder, column decoder, or both. In some cases, memory cells within memory 310 store information in the form of a logical state.

I/O module 415 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

According to some aspects, monitoring component 320 receives state information that describes a state of a decision making agent in an environment. In some examples, monitoring component 320 monitors user interactions between a user and a set of content items, where the state information is based on the user interactions.

According to some aspects, policy neural network 325 computes an action vector from an action embedding space based on the state information, where the policy neural network 325 is trained using reinforcement learning based on a topology loss that constrains changes in a mapping between an action set and the action embedding space. In some examples, policy neural network 325 computes an action embedding of the action based on the mapping. In some aspects, the parameters of the policy neural network 325 include parameters corresponding to the mapping.

According to some aspects, policy neural network 325 is configured to compute an action vector from an action embedding space based on the state information, wherein the policy neural network 325 is trained using reinforcement learning based on a topology loss that constrains changes in a mapping between an action set and the action embedding space. Policy neural network 325 is an example of, or includes aspects of, the corresponding element described with reference to FIG. 9.

According to some aspects, action component 330 performs an action that modifies the state of the decision making agent in the environment based on the action vector, where the action is selected based on the mapping between the action set and the action embedding space. In some examples, action component 330 calculates a distance between the action embedding and the action vector in the action embedding space. In some examples, action component 330 selects the action based on the distance between the action embedding and the action vector. In some examples, action component 330 recommends a content item from the set of content items to the user, where the action includes the recommendation.

According to some aspects, action component 330 adds a new action to the action set. In some examples, action component 330 updates the mapping to include the new action.

In some aspects, the topology loss described with reference to the policy neural network 325 is based on a level of exploration in the environment. In some examples, to further train the decision making apparatus 300, learning component 335 computes a reward based on the modified state. In some examples, learning component 335 updates parameters of the policy neural network 325 based on the reward and the topology loss. In some examples, learning component 335 embeds the reward in the action embedding space, and the parameters of the policy neural network 325 are further updated based on the embedding of the reward.

According to some aspects, learning component 335 determines parameters of the mapping based on competitive Hebbian learning. In some examples, learning component 335 enables an adaptive topology by computing a decay value, where the topology loss is based on the decay value.

In some aspects, the learning component 335 is configured to compute distances between each of a set of action embeddings in the action embedding space, where each of the set of action embeddings corresponds to an action from the action set, and where the topology loss is based on the distances.

In some aspects, the monitoring component 320, policy neural network 325, action component 330, and learning component 335, among others, are implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the components and the functions described herein may be implemented in hardware or software and may be executed by a processor, firmware, or any combination thereof. If implemented in software executed by a processor, the functions may be stored in the form of instructions or code on a computer-readable medium.

Automated Decision Making

FIGS. 4-7 describe systems and methods for lifelong reinforcement learning. One or more aspects of the method include receiving state information that describes a state of a decision making agent in an environment; computing an action vector from an action embedding space based on the state information using a policy neural network of the decision making agent, wherein the policy neural network is trained using reinforcement learning based on a topology loss that constrains changes in a mapping between an action set and the action embedding space; and performing an action that modifies the state of the decision making agent in the environment based on the action vector, wherein the action is selected based on the mapping. In some aspects, the topology loss is based on a level of exploration in the environment.

Some examples of the method, apparatus, non-transitory computer readable medium, and system further include monitoring user interactions between a user and a set of content items, wherein the state information is based on the user interactions. Some examples further include recommending a content item from the set of content items to the user, wherein the action includes the recommendation.

Some examples of the method, apparatus, non-transitory computer readable medium, and system further include computing an action embedding of the action based on the mapping. Some examples further include calculating a distance between the action embedding and the action vector in the action embedding space. Some examples further include selecting the action based on the distance between the action embedding and the action vector.

Some examples of the method, apparatus, non-transitory computer readable medium, and system further include computing a reward based on the modified state. Some examples further include updating parameters of the policy neural network based on the reward.

In some aspects, the parameters of the policy neural network include parameters corresponding to the mapping. In some aspects, the parameters corresponding to the mapping are updated based on the topology loss.

Some examples of the method, apparatus, non-transitory computer readable medium, and system further include embedding the reward in the action embedding space, wherein the parameters of the policy neural network are updated based on the embedding of the reward.

Figure 4:
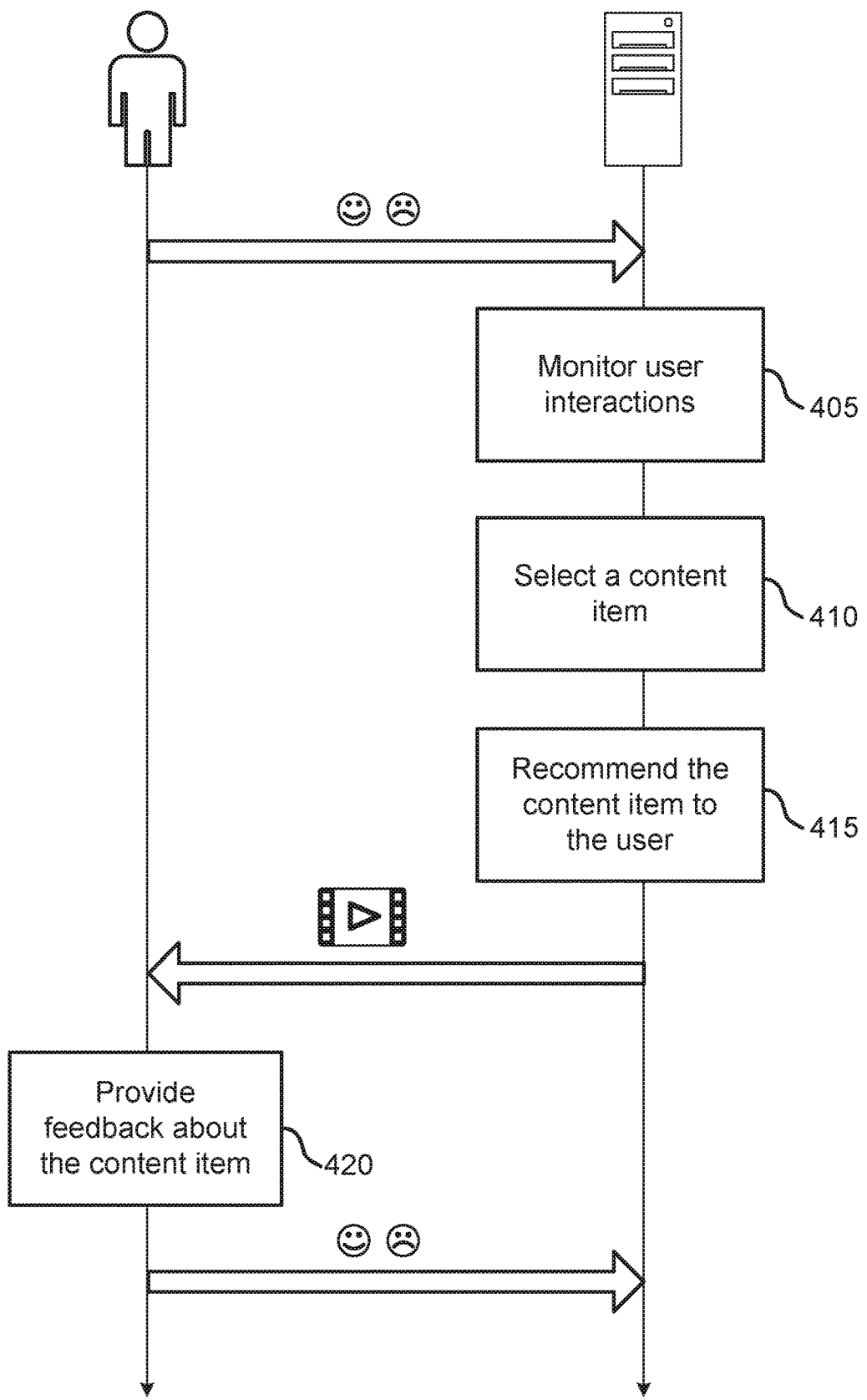
FIG. 4 shows an example of a method for automated decision making according to aspects of the present disclosure.

FIG. 4 shows an example of a method for automated decision making according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system monitors user interactions. In some aspects, the system is the decision making apparatus, and the user interactions are a part of the state information as observed from the environment. In some embodiments, the user interactions include feedback on content items, interactions with an application, general usage of an electronic device, and the like. In some cases, the operations of this step refer to, or may be performed by, a monitoring component of a decision making apparatus as described with reference to FIG. 3.

At operation 410, the system selects a content item. In some aspects, the content item includes a new marketing offer, a new email template, or a new video tutorial, etc. In an embodiment, the content item is chosen to be presented to the user in order to further the user's journey in a product or topic. In some cases, the selection of the content item is performed by the policy neural network as described with reference to FIG. 3.

At operation 415, the system recommends the content item to the user. The way the content item is recommended can vary across embodiments. In some cases, the content item is presented in an email, or on a webpage. In other cases, the content item can be presented when the user is at a physical storefront. In some cases, the operations of this step refer to, or may be performed by, an action component as described with reference to FIG. 3.

At operation 420, the environment provides feedback about the content item. In some cases, the operations of this step are performed by the environment (including a user and a user device) as described with reference to FIG. 1 or FIG. 2. The user may interact and provide feedback on the content item through a user interface, as described with reference to FIG. 1. In some cases, the user can indicate a positive or negative opinion of the content item.

Figure 5:
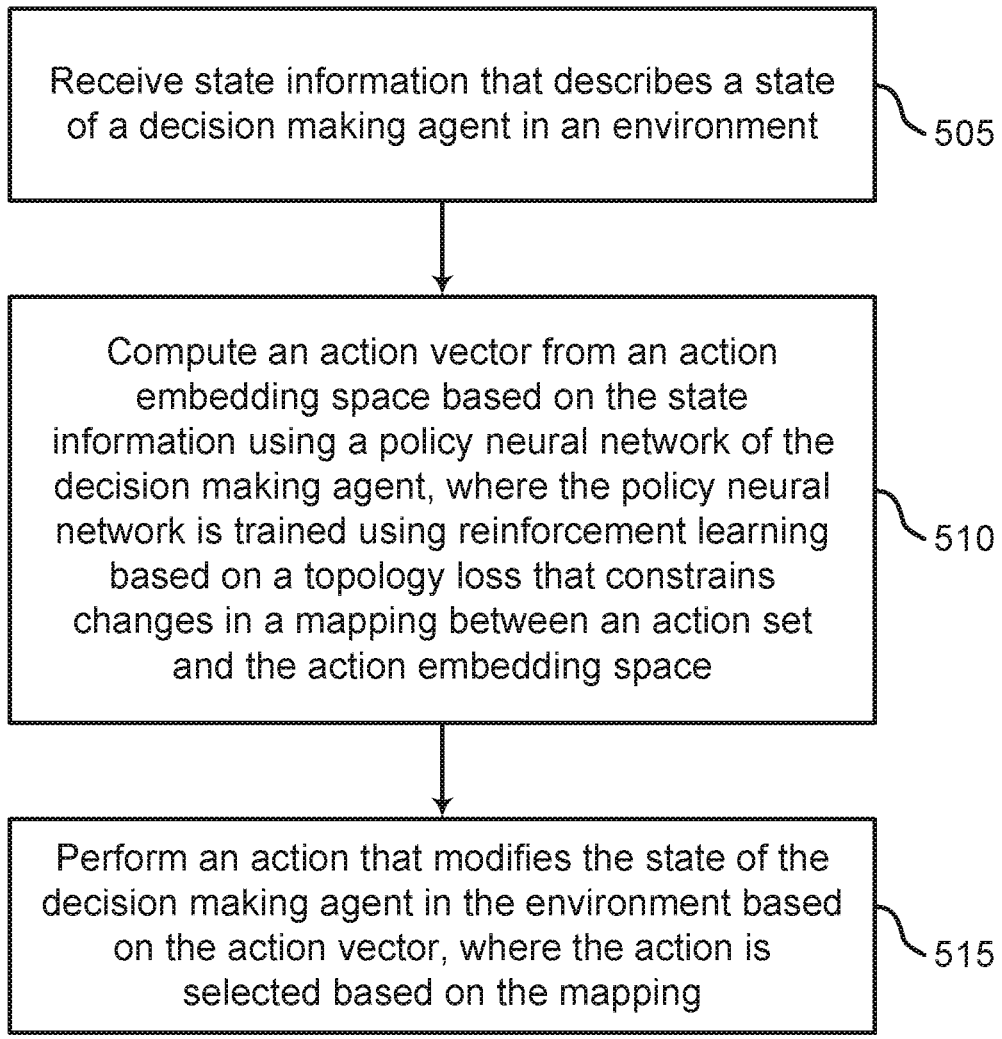
FIG. 5 shows an example of a method for machine learning according to aspects of the present disclosure.

FIG. 5 shows an example of a method for machine learning according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system receives state information that describes a state of a decision making agent in an environment. In some cases, the operations of this step refer to, or may be performed by, a monitoring component as described with reference to FIG. 3.

At operation 510, the system computes an action vector from an action embedding space based on the state information using a policy neural network of the decision making agent, where the policy neural network is trained using reinforcement learning based on a topology loss that constrains changes in a mapping between an action set and the action embedding space. In some cases, the operations of this step refer to, or may be performed by, a policy neural network as described with reference to FIGS. 3 and 9. In some embodiments, the action vector is a representation of a set of actions and corresponding probabilities for which action will achieve the highest cumulative reward. In some embodiments, the set of actions represented in the action vector correspond to a set of discrete actions available to a decision making agent (such as the decision making apparatus described with reference to FIG. 3). In some embodiments, the action embedding space includes a representation of latent actions and rewards corresponding to previously added and embedded discrete actions and rewards. The embodiment described with reference to FIG. 6 goes into further detail about a method for computing and selecting an action.

At operation 515, the system performs an action that modifies the state of the decision making agent in the environment based on the action vector, where the action is selected based on the mapping. In some cases, the operations of this step refer to, or may be performed by, an action component as described with reference to FIG. 3.

Figure 6:
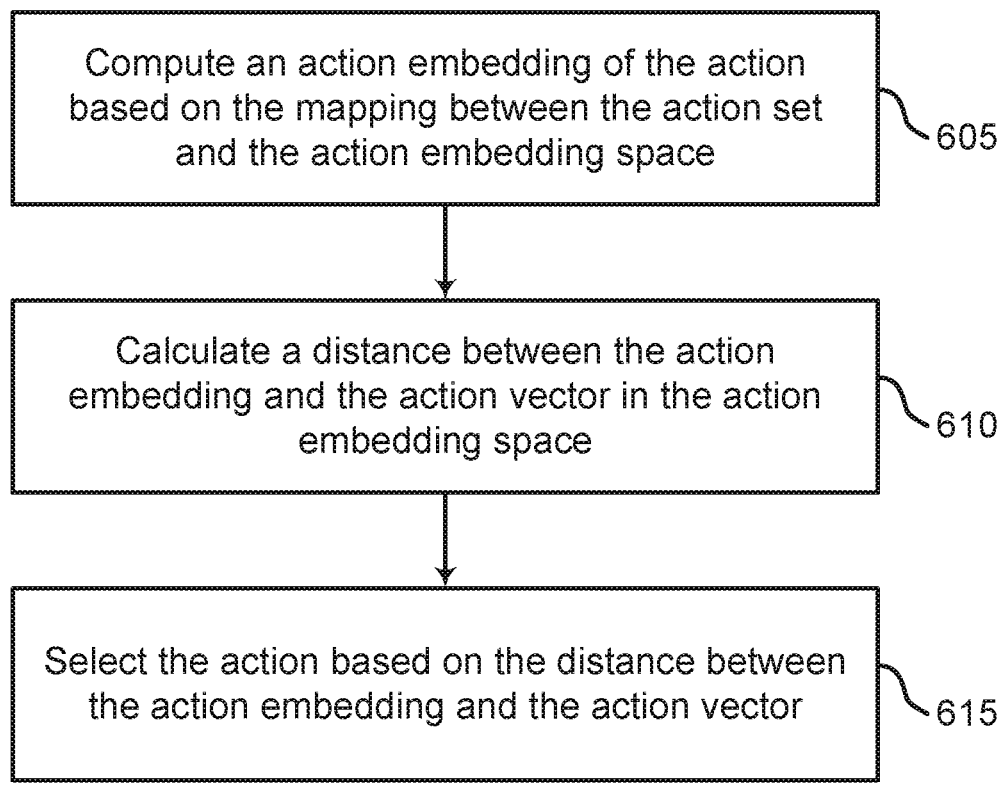
FIG. 6 shows an example of a method for selecting an action according to aspects of the present disclosure.

FIG. 6 shows an example of a method for selecting an action according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Embodiments of the present disclosure provide a reinforcement learning model based on an MDP. The method described with reference to FIG. 6 may correspond to selecting an action from an action set in the MDP model. An MDP with a discrete action space can be defined as $\mathcal{M}_0 = \langle \mathcal{S}, \mathcal{A}, \mathcal{P}, r, \gamma \rangle$, where $\mathcal{S}$ is the state space of the environment. At each time t, the agent observes the state $\mathcal{S}_t \in \mathcal{S}$ $\mathcal{A}$ is the action space, the discrete set of actions available to the agent to interact with the environment. At each time t, the agent takes an action $\mathcal{A}_t \in \mathcal{A}$, and $\Delta(\mathcal{A})$ are the probability measures on $\mathcal{A}$ $\mathcal{P}$ is the transition function, which represents the dynamics of the environment in response to the agent's actions, $\mathcal{P}: \mathcal{S} \times \mathcal{A} \to \Delta(\mathcal{S})$, where $\Delta(\mathcal{S})$ are the probability measures on $\mathcal{S}$, i.e., the next states $\mathcal{R}$ is the reward function, $\mathcal{R}: \mathcal{S} \times \mathcal{A} \to \mathbb{R}$ and represents the per-step reward function. $R_t = r(\mathcal{S}_t, \mathcal{A}_t)$ represents the per-step reward the agent receives from the environment at time t, given the state is denoted by the random variable $\mathcal{S}_t$ and the action taken by the agent is denoted by the random variable $\mathcal{A}_t$. For infinite horizon reinforcement learning, the rewards may be uniformly bounded, i.e. $R_t \in [R_{min}, R_{max}]$, for all t, and $\gamma$ is the scalar discount factor from between 0 and 1

The objective of the agent is to learn a policy $\pi: \mathcal{S} \to \Delta(\mathcal{A})$ that maximizes its expected cumulative discounted return, given by:

$$J^\pi = \mathbb{E}\left[\sum_{t=0}^{\infty} \gamma^t R_{t+1} | S_{t+1} \sim \mathcal{P}(S_t, A_t); A_t \sim \pi(S_t); R_t = r(S_t, A_t), S_0 \sim \mathrm{P}(S_0)\right], \quad (1)$$

where $P(S_0)$ denotes the distribution of the starting state. In reinforcement learning (RL), the transition function $\mathcal{P}$ and the reward function r are unknown. The objective has to be estimated by collecting samples after interacting with the environment.

In many real case scenarios, however, the set of available actions varies over time. Standard MDP frameworks are not suitable for incorporating this change. A lifelong MDP model (LMDP) can be defined as: $\mathcal{L}=(\mathcal{M}_0, \varepsilon, \mathcal{D}, \mathcal{F})$, where:

- $\varepsilon$ is the set of all possible actions, including those that are available at one point in time and those that might become available at any time in the future
- $\mathcal{D}$ is the set of distributions $\mathcal{D}_\tau$, from which a random variable corresponding to the set of actions added at episode $\tau$ is sampled, and
- $\mathcal{F}$ is the probability distribution over the episode count from which the random variable is sampled, that indicates whether a new set of actions are added or not In this lifelong version, for the initial MDP $\mathcal{M}_0$, embodiments define the initial set of actions A to be empty. Over the lifetime of some embodiments, the set of available actions changes, and the agent observes a new set of discrete actions.

For any MDP $\mathcal{M}_k$ in the LMDP $\mathcal{L}$, an agent's goal is to find a policy $\pi_k$ that maximizes the expected sum of discounted future rewards. For any policy $\pi_k$, the corresponding state value function is:

$$v^{\pi_k}(s) = E\left[\sum_{t=0}^{\infty} \gamma^t R_t | s, \pi_k\right] \quad (2)$$

Instead of having the policy act directly in the observed action space, embodiments use an approach wherein the agent utilizes an embedded space to determine a discrete action. This makes its policy parameterization invariant to the number of actions available to the agent.

To do this, the policy parameterization is split into two components. The first component corresponds to the state conditional policy responsible for making the decisions, $\beta$: $\mathcal{S} \times \hat{\varepsilon} \rightarrow [0,1]$, where $\hat{\varepsilon} \in \mathbb{R}^d$. This is the main policy that is responsible for making decisions conditioned on the state to maximize the reward.

The second component corresponds to $\hat{\phi}: \hat{\varepsilon} \times \mathcal{A} \rightarrow [0,1]$, an estimator of the relation $\phi$, which is used to map the output of $\beta$, the latent action, to an action in the set of available actions.

That is, an action at a given time $E_t \in \hat{\varepsilon}$ is sampled from $\beta(S_t, \bullet)$ and then $\hat{\phi}(E_t)$ is used to obtain the action $A_t$. Together, $\beta$ and $\hat{\phi}$ form the complete policy, and $\hat{\varepsilon}$ corresponds to the inferred structure in action space.

Thus, at operation 605, the system computes an action embedding of the action based on the mapping between the action set and the action embedding space. For example, computing the action embedding may occur when a new action is added to the embedding space, or at some point throughout the lifetime of the system, for example, when new state information is obtained. In some cases, the operations of this step refer to, or may be performed by, a policy neural network as described with reference to FIGS. 3 and 9.

At operation 610, the system calculates a distance between the action embedding and the action vector in the action embedding space. In some cases, the operations of this step refer to, or may be performed by, an action component as described with reference to FIG. 3.

At operation 615, the system selects the action based on the distance between the action embedding and the action vector. In some cases, the operations of this step refer to, or may be performed by, an action component as described with reference to FIG. 3. Accordingly, with system can select the best discrete action based on the determine mapping from a latent action, $\hat{E}_t$ in the action embedding space to the discrete action $\hat{A}_t$, where the action vector includes the discrete action $\hat{A}_t$.

Figure 7:
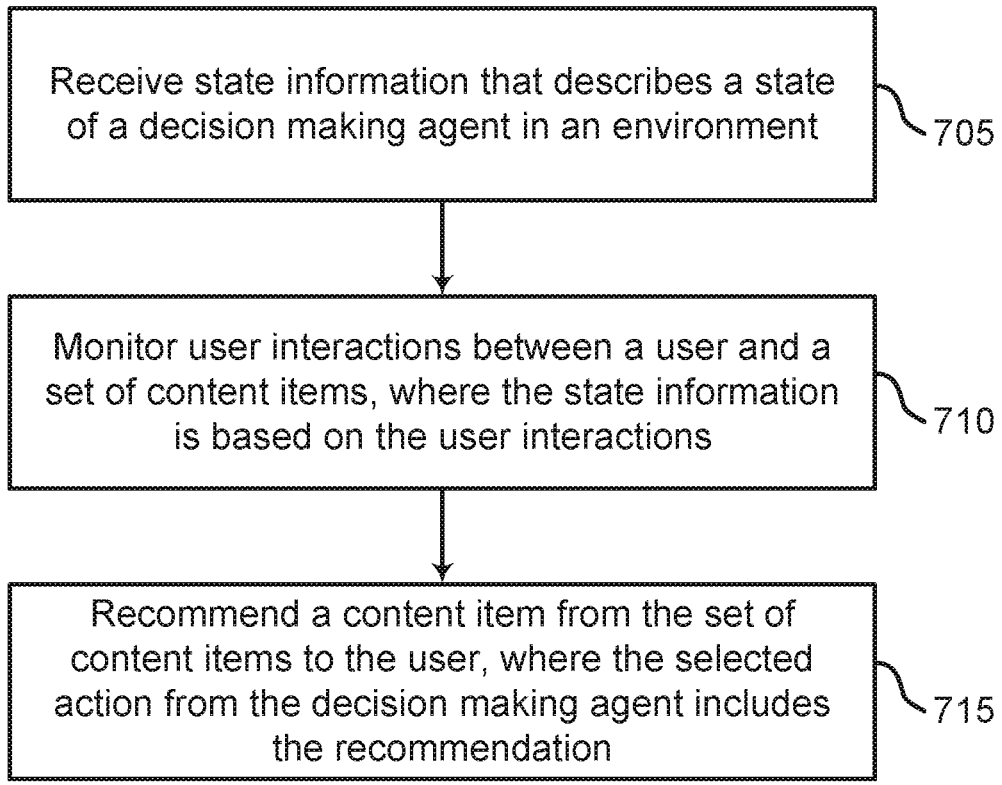
FIG. 7 shows an example of a method for recommending a content item to a user according to aspects of the present disclosure.

FIG. 7 shows an example of a method for recommending a content item to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives state information that describes a state of a decision making agent in an environment. In some cases, the operations of this step refer to, or may be performed by, a monitoring component as described with reference to FIG. 3.

At operation 710, the system monitors user interactions between a user and a set of content items, where the state information is based on the user interactions. In some cases, the operations of this step refer to, or may be performed by, a monitoring component as described with reference to FIG. 3.

At operation 715, the system recommends a content item from the set of content items to the user, where the selected action from the decision making agent includes the recommendation. In some cases, the operations of this step refer to, or may be performed by, an action component as described with reference to FIG. 3.

Adaptive Reinforcement Learning

FIGS. 8-11 describe systems and methods for training embodiments for lifelong reinforcement learning. Some aspects describe how embodiments learn, which refers to how the decision making agents incorporate new actions over time while maintaining effectiveness in the task of lifelong reinforcement learning. Some embodiments utilize adaptive topology loss and augmented reward when incorporating new actions.

One or more aspects of the method include receiving state information of a decision making agent; selecting an action from an action set based on the state information using a policy neural network of the decision making agent; computing a reward based on the action; computing a topology loss that minimizes changes in a mapping between the action set and an action embedding space; and updating parameters of the policy neural network based on the reward and the topology loss. Some examples of the method, apparatus, non-transitory computer readable medium, and system further include determining parameters of the mapping based on competitive Hebbian learning.

Some examples of the method, apparatus, non-transitory computer readable medium, and system further include adding a new action to the action set. Some examples further include updating the mapping to include the new action. In some aspects, the mapping is updated based on the topology loss.

Some examples of the method, apparatus, non-transitory computer readable medium, and system further include computing distances between each of a plurality of action embeddings in the action embedding space, wherein each of the plurality of action embeddings corresponds to an action from the action set, and wherein the topology loss is based on the distances. Some examples of the method, apparatus, non-transitory computer readable medium, and system further include computing a decay value, wherein the topology loss is based on the decay value.

Some examples of the method, apparatus, non-transitory computer readable medium, and system further include embedding the reward in the action embedding space, wherein the parameters of the policy neural network are updated based on the embedding of the reward.

A method for lifelong reinforcement learning is described. One or more aspects of the method include receiving state information of a decision making agent; selecting an action from an action set based on the state information using a policy neural network of the decision making agent; computing a reward based on the action; computing a topology loss that minimizes changes in a mapping between the action set and an action embedding space; and updating parameters of the policy neural network based on the reward and the topology loss.

Some examples of the method, apparatus, non-transitory computer readable medium, and system further include adding a new action to the action set. Some examples further include updating the mapping to include the new action. In some aspects, the mapping is updated based on the topology loss.

Some examples of the method, apparatus, non-transitory computer readable medium, and system further include computing distances between each of a plurality of action embeddings in the action embedding space, wherein each of the plurality of action embeddings corresponds to an action from the action set, and wherein the topology loss is based on the distances.

Some examples of the method, apparatus, non-transitory computer readable medium, and system further include determining parameters of the mapping based on competitive Hebbian learning. Some examples of the method, apparatus, non-transitory computer readable medium, and system further include computing a decay value, wherein the topology loss is based on the decay value.

Figure 8:
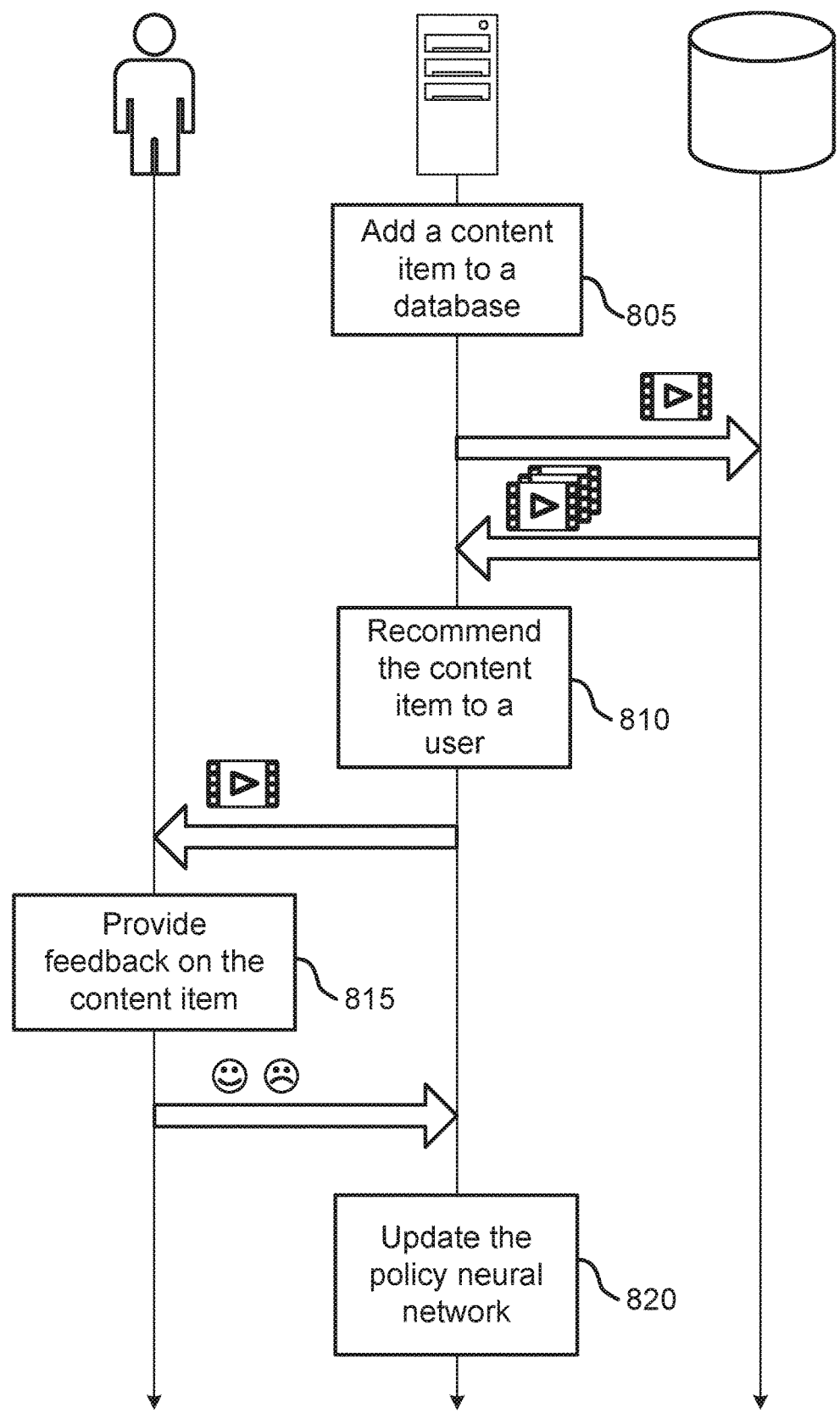
FIG. 8 shows an example of a method for lifelong reinforcement learning according to aspects of the present disclosure.

Some examples of the method, apparatus, non-transitory computer readable medium, and system further include embedding the reward in the action embedding space, wherein the parameters of the policy neural network are updated based on the embedding of the reward. FIG. 8 shows an example of a method for lifelong reinforcement learning according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system adds a content item to a database. In some embodiments, the content item corresponds to a new marketing offer, a new email template, or a new video tutorial, etc. In some embodiments, the system (e.g., the decision making apparatus) embeds the new action into the action embedding space while utilizing the adaptive topology loss and the augmented reward, i.e., the decision making apparatus further embeds a reward associated with the new action into the action embedding space.

At operation 810, the system (e.g., the decision making apparatus) recommends the content item to a user. The way the content item is recommended can vary across embodiments. In some cases, the content item is presented in an email, or on a webpage. In other cases, the content item can be presented when the user is at a physical storefront.

At operation 815, the user provides feedback on the content item. In this way, the user can act as the environment, and provide state information to the decision making apparatus. The user may interact and provide feedback on the content item through a user interface, as described with reference to FIG. 1. In some cases, the user can indicate a positive or negative opinion of the content item.

At operation 820, the system updates the policy neural network. In some embodiments, the system also updates the actions embedding space to incorporate the feedback and adjust the nodes to represent different reward information as a result of the feedback.

Figure 9:
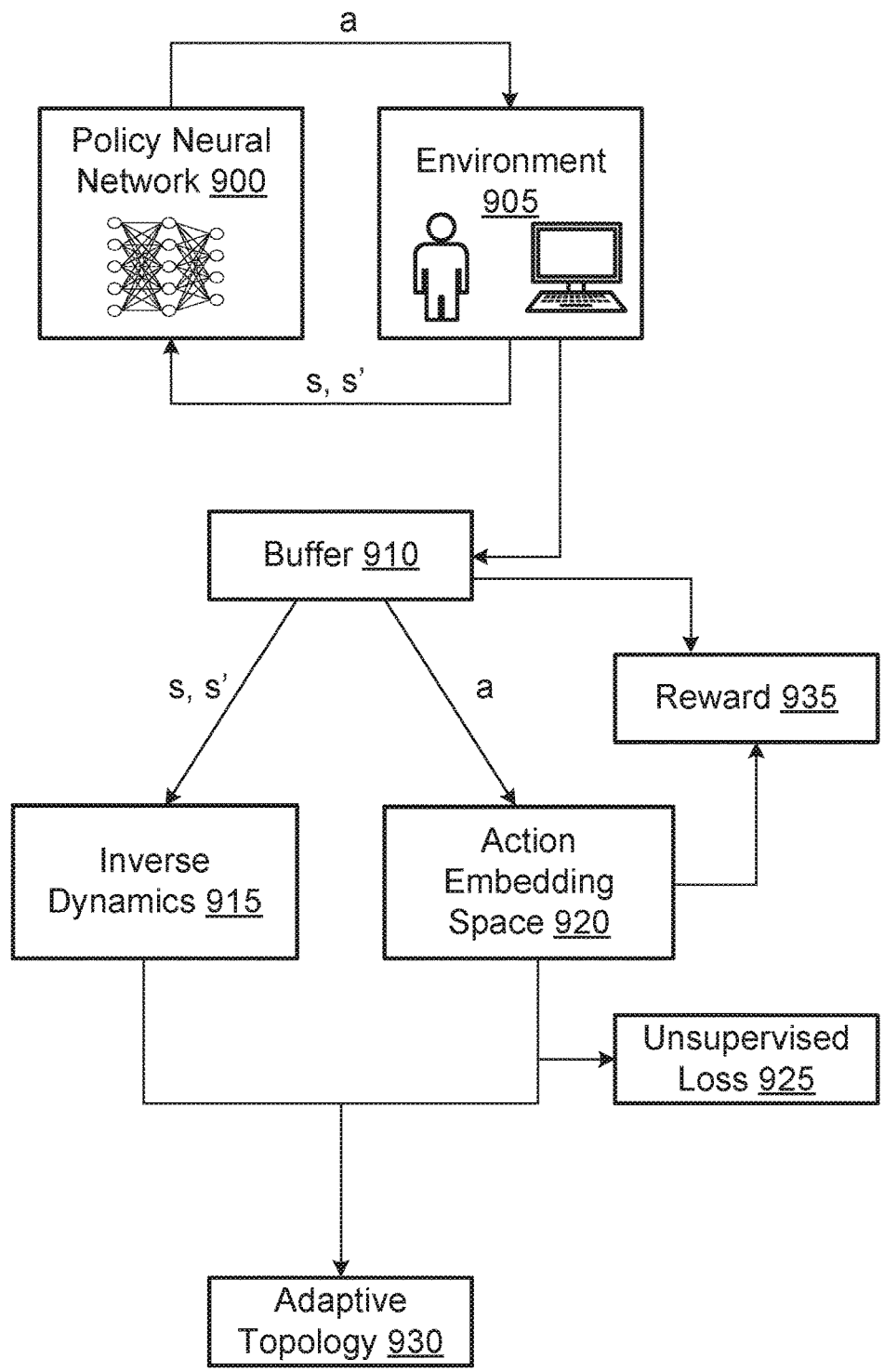
FIG. 9 shows an example of an adaptive reinforcement learning network according to aspects of the present disclosure.

FIG. 9 shows an example of an adaptive reinforcement learning network according to aspects of the present disclosure. The example shown includes policy neural network 900, environment 905, buffer 910, inverse dynamics 915, action embedding space 920, unsupervised loss 925, adaptive topology 930, and reward 935.

Policy neural network 900 is an example of, or includes aspects of, the corresponding element described with reference to FIG. 3.

Environment 905 is an example of, or includes aspects of, the corresponding element described with reference to FIGS. 1 and 2. For example, the environment may include a user and a user device, where the user device provides a user interface to allow the user to interact with content items.

In some embodiments, buffer 910 is implemented in a memory, and is used to store new actions or feedback for incorporation into action embedding space 920.

Inverse dynamics 915 is a technique for calculating an inverse function of a dynamic system. In some examples, inverse dynamics 915 allows the adaptive reinforcement learning network to generate a representation of its own structure that changes over time, and this representation is considered while the adaptive reinforcement learning network operates, so that the adaptive reinforcement learning network stays within optimal parameters.

Action embedding space 920 is an example of, or includes aspects of, the corresponding element described with reference to FIG. 2.

Unsupervised loss 925 includes losses other than the adaptive topology, and in some embodiments, is based on a difference between the observed state and the expected state. Adaptive topology 930 refers to the topology preserving loss which ensures minimal change to the topology of the action embedding space. The topology preserving loss will be described in greater detail below.

Reward 935 includes a reward associated with an action. In some embodiments, this is embedded in action embedding space 920. Another aspect of the inventive concept provide an augmented reward function. Some comparative lifelong learning models work well when the actions are constrained so as to be distinct with a unique reward present for each action. However, they do not generalize in the case of duplicate actions.

Accordingly, embodiments embed the reward information in the embedding space, which makes the policy optimization take into consideration the rewards of the actions as well. Further, evaluations of embodiments have observed that the reward prediction loss acts like a regularizer and further reinforces the learning, resulting in improved performance.

Figure 10:
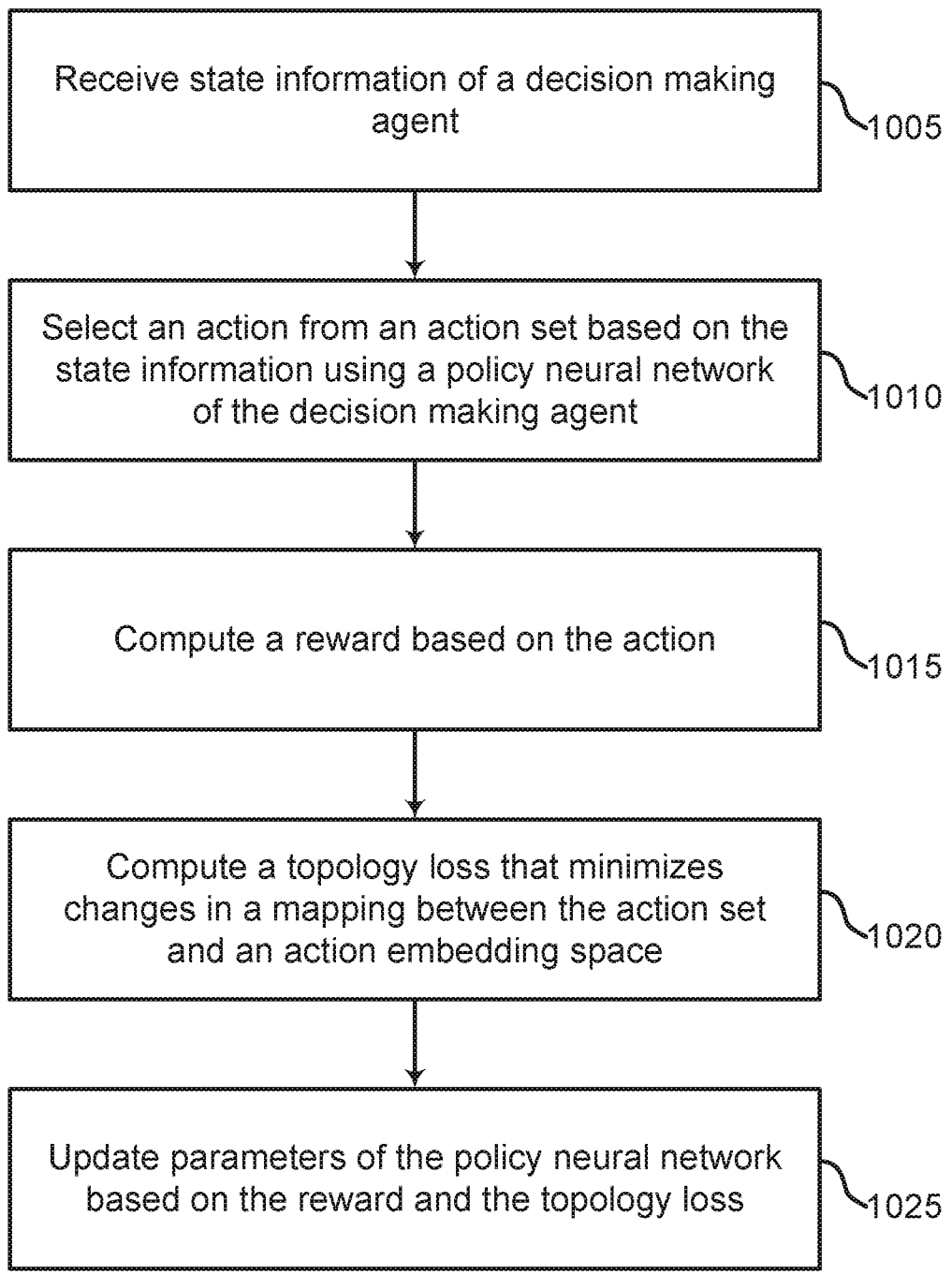
FIGS. 10 through 11 show examples of methods for machine learning according to aspects of the present disclosure.

FIG. 10 shows an example of a method for machine learning according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Some aspects provide the training of the lifelong MDP, as well as techniques that are used in the embodiments in order to mitigate some of the aforementioned issues of comparative examples, such as the "cold start problem," or the mishandling of duplicate actions. A base MDP model can be defined as $\mathcal{M}_0 = \langle \mathcal{S}, \mathcal{A}, \mathcal{P}, r, \gamma \rangle$, and a lifelong MDP (LMDP) model can be defined as $\mathcal{L} = (\mathcal{M}_0, \varepsilon, \mathcal{D}, \mathcal{F})$. Some embodiments, within an MDP $\mathcal{M}_k$ in the LMDP $\mathcal{L}$, use $S_t \in \mathcal{S}$, $A_t \in \mathcal{A}$, and $R_t \in \mathbb{R}$ as random variables for denoting the state, action, and reward at time $t \in \{0, 1, \ldots\}$ within each episode. The first state $S_0$ comes from an initial distribution $d_0$. Again, in some cases the reward is bounded such that $R_t \in [-R_{max}, R_{max}]$ for some finite $R_{max}$.

$\mathcal{P}$ is the state transition function, such that for all s, a, s', t, the function $\mathcal{P}$ (s, a, s') denotes the transition probability P (s'|s, e), where a=ϕ(e) and e is the underlying structure of the action.

It is possible that new actions could be arbitrary with no relations to the actions seen before. However, this limits the applicability of lifelong learning models that leverage past experience, and would not be seen in most application contexts. Accordingly, embodiments are configured for a level of smoothness between actions. In an example, it is assumed that transition probabilities in the LMDP are ρ-Lipschitz in the structure of actions.

In some embodiments, it may be assumed that $\exists \rho > 0$ s.t. $\forall s_1$ s', $e_i$, $e_j$, and, $$\|P(s'|s,e_i) - P(s'|s,e_j)\|_1 \leq \rho \nu \|e_i - e_j\|_1 \quad (3)$$

Further, to make the policy parameterization of the decision making agent invariant to the number of available actions, the policy parameterization is split into two components: β, which corresponds to the state conditional policy, and $\hat{\phi}: \hat{\varepsilon} \times \mathcal{A} \to [0,1]$, an estimator of the relation ϕ, which is used to map the output of β to an action in the set of available actions. The first term establishes accurate mapping from the latent action, $\hat{E}_t$, to the discrete action $\hat{A}_t$ whereas the second term ensures good latent action prediction. Further, φ denotes the inverse dynamics function that predicts the latent action given the current state and the next state.

$$\mathcal{L}^{lb}(\hat{\phi}, \varphi) := \quad (4)$$

$$E\left[\log \hat{\phi}(\hat{A}_t | \hat{E}_t) \big| \hat{E}_t \sim \varphi(\cdot | S_t, S_{t+1})\right] - \lambda KL\big(\varphi(\hat{E}_t | S_t, S_{t+1}) \| \mathcal{P}(\hat{E}_t | S_t, S_{t+1})\big)$$

Equation (4) describes the LMDP model $\mathcal{L}$ in terms of the above described components.

A loss function ensures that the topology is maintained across the lifetime (i.e., topological invariance), and that both the inverse dynamics function φ, and the latent-to-discrete component $\hat{\phi}$ are trained simultaneously to accurately predict the discrete action corresponding to the transition from $S_t$ to $S_{t+1}$. When a new action is added, the action embeddings (e.g., in an action embedding space) are updated, which can affect the topology of the embedding space. It is desired not to affect the embeddings of the old actions significantly. Further, having a stable embedding space will enable ease of transfer learning between the old problem with the old action space and the new problem with the new action space.

Accordingly, embodiments include a topology preserving loss. Topology is preserved by maintaining the similarity between nodes (action embeddings), i.e., the relative Euclidian distance between them remains constant, and actions are added with minimal distortion.

The Topology Preserving Loss or $\ell_{TPL}$ is a correlation of distance between different nodes prior to action addition with the distance between nodes after action addition. The distances between two nodes may be determined as a Euclidian distance between the nodes in a Hebbian graph of the action embedding space.

The loss causes the distances to have a higher correlation, thus maintaining the topology of the action embeddings. The loss function is as follows:

$$\ell_{TPL}(G^d; \theta^{t+1}) = -\frac{\sum_{i,j}^{N}\left(s_{ij} - \frac{1}{N^2}\sum_{i,j}^{N} s_{ij}\right)\left(\tilde{s}_{ij} - \frac{1}{N^2}\sum_{i,j}^{N} \tilde{s}_{ij}\right)}{\sum_{i,j}^{N}\left(s_{ij} - \frac{1}{N^2}\sum_{i,j}^{N} s_{ij}\right)^2 \sqrt{\sum_{i,j}^{N}\left(\tilde{s}_{ij} - \frac{1}{N^2}\sum_{i,j}^{N} \tilde{s}_{ij}\right)^2}} \quad (5)$$

where $S = \{s_{ij} | 1 \leq i, j \leq N\}$ and $\tilde{S} = \{\tilde{s}_{ij} | 1 \leq i, j \leq N\}$ are the sets of the initial and observation values of edges' weights in $E_t$, respectively.

The active value $\tilde{s}_{ij}$ is estimated by:

$$\tilde{s}_{ij} = \tilde{f}_i^T \tilde{f}_j = \tilde{f}(u_i; \theta^{t+1})^T \tilde{f}(u_j; \theta^{t+1}) \quad (6)$$

While it is useful to preserve topology to improve performance, over-preserving the topology, especially early in the lifetime of the model, can lead to cases where the agent is unable to explore enough actions, which may cause decreased performance when the agent is unable to consider a more optimal action.

Accordingly, embodiments utilize an adaptive topology loss which takes into account the level of exploration, instead of restricting the action embeddings excessively from the beginning. For example, some embodiments use an exponential decay in the topology loss to adapt to the level of exploration. In the present disclosure, this is referred to as adaptive topology.

With reference to FIG. 10, at operation 1005, the system receives state information of a decision making agent. In some cases, the operations of this step refer to, or may be performed by, a monitoring component as described with reference to FIG. 3.

At operation 1010, the system selects an action from an action set based on the state information using a policy neural network of the decision making agent. In some cases, the operations of this step refer to, or may be performed by, a policy neural network as described with reference to FIGS. 3 and 9.

At operation 1015, the system computes a reward based on the action. In some cases, the operations of this step refer to, or may be performed by, a learning component as described with reference to FIG. 3.

At operation 1020, the system computes a topology loss that minimizes changes in a mapping between the action set and an action embedding space. In some cases, the operations of this step refer to, or may be performed by, a learning component as described with reference to FIG. 3. The computation of the topology loss is described in further detail with reference to FIG. 11.

At operation 1025, the system updates parameters of the policy neural network based on the reward and the topology loss. In some cases, the operations of this step refer to, or may be performed by, a learning component as described with reference to FIG. 3.

Figure 11:
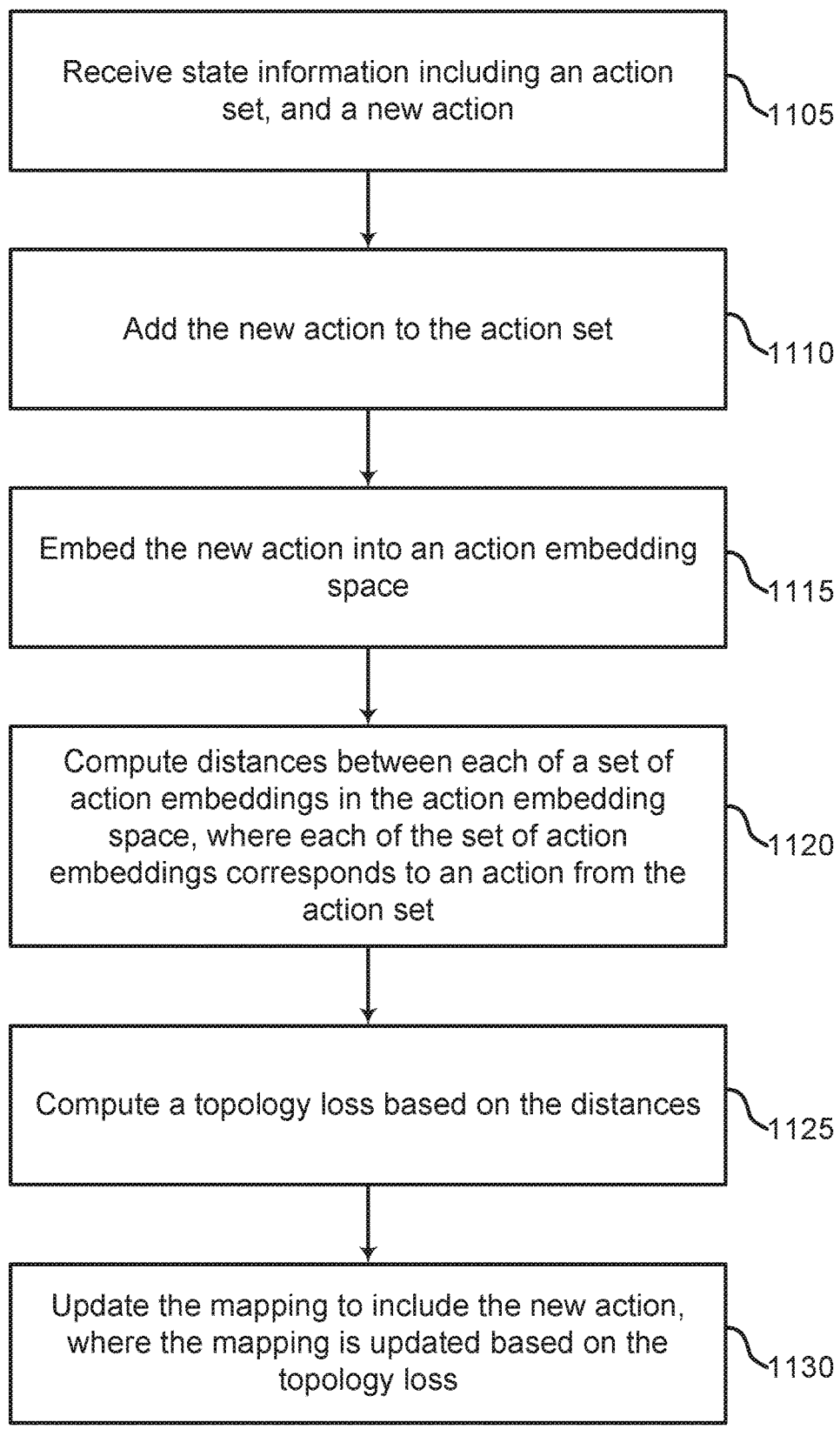

FIG. 11 shows an example of a method for machine learning according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system receives state information including an action set, and a new action. In some cases, the operations of this step refer to, or may be performed by, a monitoring component as described with reference to FIG. 3.

At operation 1110, the system adds the new action to the action set. In some cases, the operations of this step refer to, or may be performed by, an action component as described with reference to FIG. 3.

At operation 1115, the system embeds the new action into an action embedding space. In some cases, the operations of this step refer to, or may be performed by, an action component as described with reference to FIG. 3.

At operation 1120, the system computes distances between each of a set of action embeddings in the action embedding space, where each of the set of action embeddings corresponds to an action from the action set. In some cases, the operations of this step refer to, or may be performed by, an action component as described with reference to FIG. 3.

At operation 1125, the system computes a topology loss based on the distances. In some cases, the operations of this step refer to, or may be performed by, a learning component as described with reference to FIG. 3.

At operation 1130, the system updates the mapping to include the new action, where the mapping is updated based on the topology loss. In some cases, the operations of this step refer to, or may be performed by, an action component as described with reference to FIG. 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of machine learning, comprising:
receiving, by a monitoring component, state information that describes a state of a decision making agent in an environment;
computing, using a policy neural network of the decision making agent, an action vector from an action embedding space based on the state information, wherein the policy neural network is trained using reinforcement learning based on a topology loss that constrains changes in a mapping between an action set and the action embedding space; and performing, by the decision making agent, an action that modifies the state of the decision making agent in the environment based on the action vector, wherein the action is selected based on the mapping.

2. The method of claim 1, further comprising:
computing, by the policy neural network, an action embedding of the action based on the mapping;
calculating, by an action component, a distance between the action embedding and the action vector in the action embedding space; and
selecting, by the action component, the action based on the distance between the action embedding and the action vector.

3. The method of claim 1, wherein:
the topology loss is based on a level of exploration in the environment.

4. The method of claim 1, further comprising:
computing, by a learning component, a reward based on the modified state; and
updating, by the learning component, parameters of the policy neural network based on the reward.

5. The method of claim 4, wherein:
the parameters of the policy neural network include parameters corresponding to the mapping.

6. The method of claim 5, wherein:
the parameters corresponding to the mapping are updated based on the topology loss.

7. The method of claim 4, further comprising:
embedding, by the learning component, the reward in the action embedding space, wherein the parameters of the policy neural network are updated based on the embedding of the reward.

8. The method of claim 1, further comprising:
monitoring, by the monitoring component, user interactions between a user and a set of content items, wherein the state information is based on the user interactions; and
recommending, by an action component, a content item from the set of content items to the user, wherein the action includes the recommendation.

9. A method for machine learning, comprising:
receiving, by a monitoring component, state information of a decision making agent;
selecting, by an action component, an action from an action set based on the state information using a policy neural network of the decision making agent;
computing, by a learning component, a reward based on the action;
computing, by the learning component, a topology loss that minimizes changes in a mapping between the action set and an action embedding space; and
updating, by the learning component, parameters of the policy neural network based on the reward and the topology loss.

10. The method of claim 9, further comprising:
adding, by the action component, a new action to the action set; and
updating, by the action component, the mapping to include the new action.

11. The method of claim 10, wherein:
the mapping is updated based on the topology loss.

12. The method of claim 9, further comprising:
computing, by the action component, distances between each of a plurality of action embeddings in the action embedding space, wherein each of the plurality of action embeddings corresponds to an action from the action set, and wherein the topology loss is based on the distances.

13. The method of claim 9, further comprising:
determining, by the learning component, parameters of the mapping based on competitive Hebbian learning.

14. The method of claim 9, further comprising:
computing, by the learning component, a decay value, wherein the topology loss is based on the decay value.

15. The method of claim 9, further comprising:
embedding, by the learning component, the reward in the action embedding space, wherein the parameters of the policy neural network are updated based on the embedding of the reward.

16. An apparatus for machine learning, comprising:
a monitoring component configured to receive state information indicating a state of an environment;
a policy neural network configured to compute an action vector from an action embedding space based on the state information, wherein the policy neural network is trained using reinforcement learning based on a topology loss that constrains changes in a mapping between an action set and the action embedding space; and
an action component configured to perform an action that modifies the state based on the action vector, wherein the action is selected based on the mapping.

17. The apparatus of claim 16, further comprising:
a learning component configured to compute a reward based on the action, and to update parameters of the policy neural network based on the reward.

18. The apparatus of claim 17, wherein:
the learning component is configured to compute distances between each of a plurality of action embeddings in the action embedding space, wherein each of the plurality of action embeddings corresponds to an action from the action set, and wherein the topology loss is based on the distances.

19. The apparatus of claim 16, further comprising:
a learning component configured to compute a decay value, and wherein the topology loss is based on the decay value.

20. The apparatus of claim 16, further comprising:
a learning component configured to embed a reward in the action embedding space, and wherein parameters of the policy neural network are updated based on the embedding of the reward.

* * * * *